United States Patent [19]

Carpenter

[11] Patent Number: 4,596,781
[45] Date of Patent: Jun. 24, 1986

[54] TOUGH $Si_3N_4$ COMPOSITE CERAMICS

[75] Inventor: Harry W. Carpenter, Northridge, Calif.

[73] Assignee: Rockwell International Corporation, El Segundo, Calif.

[21] Appl. No.: 771,087

[22] Filed: Aug. 30, 1985

[51] Int. Cl.$^4$ .................. C04B 35/02; C04B 35/58
[52] U.S. Cl. ............................ 501/94; 264/60; 264/66; 264/125; 501/97; 501/98
[58] Field of Search ............ 501/94, 97, 98; 264/60, 264/66, 125

[56] References Cited

U.S. PATENT DOCUMENTS

| | | | |
|---|---|---|---|
| 3,657,063 | 4/1972 | Brown et al. | 428/432 |
| 4,298,385 | 11/1981 | Claussen et al. | 501/94 |
| 4,376,652 | 3/1983 | Buljan | 501/97 |
| 4,421,528 | 12/1983 | Buljan et al. | 264/60 |
| 4,506,024 | 3/1985 | Claussen et al. | 501/105 |

*Primary Examiner*—Helen M. McCarthy
*Attorney, Agent, or Firm*—H. Fredrick Hamann; Harry B. Field

[57] ABSTRACT

A tough $Si_3N_4$ ceramic composite is provided by incorporating a ternary oxide additive containing hafnia, titania and zirconia. The ternary oxide additive consists essentially of 60 to 85 mole percent hafnia, 10 to 30 mole percent titania and 10 to 30 mole percent zirconia, and is added to the $Si_3N_4$ in a proportion ranging from about 10 to about 50%, by volume of ternary oxide additive, based on the overall composition. The ceramic composites are prepared by providing a mixture of the $Si_3N_4$ and the ternary oxide additive, forming the mixture into a predetermined shape, e.g. by cold pressing, and sintering the shape at an appropriate temperature, to solidify and densify the shape.

8 Claims, No Drawings

've
TOUGH $Si_3N_4$ COMPOSITE CERAMICS

BACKGROUND OF THE INVENTION

1. Field of the Invention

This invention relates to the field of ceramics, and particularly to the field of low thermal expansion $Si_3N_4$ composites.

2. Description of the Prior Art

Ceramic compositions produced from silicon nitride and silicon carbide are the two most advanced ceramic materials presently employed. Silicon nitride has an advantage over silicon carbide in that the former has a lower thermal expansion coefficient than the latter.

$Si_3N_4$ can be made tougher by adding a second phase. Thus, for example zirconium oxide, $ZrO_2$, has been added to $Si_3N_4$, but since $Si_3N_4$ has a low thermal expansion coefficient while $ZrO_2$ has a relatively high thermal expansion coefficient, the thermal expansion coefficient of the resulting $Si_3N_4/ZrO_2$ composites is increased over that of $Si_3N_4$ alone.

$Si_3N_4$ has also been toughened by incorporating fiber. However, fiber-reinforced $Si_3N_4$, for example, suffers from (1) the difficulty in orienting and dispersing the fibers or whiskers, and (2) reactions between the fibers and $Si_3N_4$ matrix. Dispersion toughened $Si_3N_4$ has not shown significant improvements because the dispersoids (a) were too large, (b) were poorly dispersed, or (c) had a higher coefficient of thermal expansion (COTE) than the $Si_3N_4$ matrix. A higher COTE may actually hinder toughening mechanisms. Cracks prefer to propagate normal to tensile stresses and parallel to compressive stresses. Thus, cracks are deflected around particles in hydrostatic tension (COTE dispersoid >COTE $Si_3N_4$) but attracted into particles under hydrostatic compression (COTE dispersoid <COTE $Si_3N_4$). When cracks propagate around particles, the particles accomplish little in toughening the matrix. When cracks propagate into particles, on the other hand, the particles can accomplish a high degree of toughening by dissipating energy and blunting the crack.

Accordingly, past attempts to produce toughened $Si_3N_4$ composites have met with only limited success.

U.S. Pat. No. 3,657,063 to S. D. Brown et al, and assigned to the same assignee as the present application, discloses a high thermal shock resistant composite formed of a first layer of a composition of low expansion particulate oxide ultimately bonded to a second layer of a low expansion preformed silica material. The particulate oxide layer consists essentially of hafnia, zirconia and titania.

SUMMARY OF THE INVENTION

There is provided according to the basic concept of the present invention, a silicon nitride ceramic composite having enhanced toughness by incorporating a ternary oxide additive containing hafnia, titania and zirconia. Such hafnia-rich mixed oxide composition described in greater detail below, has a lower thermal coefficient of expansion (COTE) than $Si_3N_4$ and when intimately mixed with the silicon nitride, induces toughness into the resulting sintered silicon nitride matrix ceramic composite.

Other features of the invention include the method of completely dispersing the ternary oxide toughening phase into the silicon nitride matrix material, and the method for forming the resulting uniform mixture of silicon nitride matrix material and ternary oxide mixture, e.g. by injection molding, prior to sintering to produce the tough $Si_3N_4$ ceramic composite of the present invention.

Thus, a toughened ceramic structural material can be fabricated according to the invention by adding to $Si_3N_4$ the above ternary oxide composition having a high melting temperature and a COTE lower than $Si_3N_4$, particularly in conjunction with wet mixing techniques which ensure complete dispersion of the toughening phase into the $Si_3N_4$.

OBJECTS OF THE INVENTION

It is accordingly an object of the present invention to provide improved low thermal expansion $Si_3N_4$ composite ceramics.

Another object of the invention is the production of $Si_3N_4$ ceramic composites containing a second phase which effects substantial toughening of the resulting silicon nitride ceramic composite.C Yet another object is the provision of $Si_3N_4$ ceramics having a low thermal expansion coefficient provided by incorporation of an additive having a high melting temperature and a COTE lower than silicon nitride.

A specific object of the invention is to provide $Si_3N_4$ ceramic composites having enhanced toughness by incorporation of a hafnia-rich mixed oxide composition having a lower COTE than $Si_3N_4$.

An additional object is the provision of procedure for producing such improved toughened $Si_3N_4$ ceramic composites.

DESCRIPTION OF THE PREFERRED EMBODIMENTS

The hafnia-rich mixed oxide composition employed in the subject invention consists essentially of commercially available hafnium oxide, titanium oxide and zirconium oxide. These oxides are generally known as hafnia ($HfO_2$), titania ($TiO_2$) and zirconia ($ZrO_2$) The ternary oxide composition as employed herein generally consists essentially of 60 to 85 mole percent hafnia, 10 to 30 mole percent titania and 10 to 30 mole percent zirconia, with the preferred mole ratio dependent upon the thermal expansion characteristics desired in the resulting $Si_3N_4$ ceramic composite.

In preferred practice, the three components of the ternary oxide composition are intimately mixed using colloidal processing techniques utilizing individual powders of submicron particle size. This is accomplished by mixing the three components in colloidal solution and then heating the mixed powders to prereact them and form a solid solution of such components, and then grinding the reacted composition to produce an intimately mixed powder of the three oxide components, for admixture with the $Si_3N_4$ matrix material.

More specifically, each of the three oxide components can be dispersed in water at a pH required to produce a good dispersion. The respective dispersed powders are separately sedimented by conventional techniques such as centrifuging to eliminate relatively large particles and agglomerates greater than 1 micron size to obtain submicron material.

Mixing of the resulting three suspensions is then carried out to obtain a uniform three phase aqueous dispersion containing the proper amount of particulate oxide component in each phase in colloidal state. If desired, the three oxide components, in appropriate proportions, can be dispersed initially in water and the relatively large particles greater than 1 micron removed by sedimentation.

The multiphase dispersion of all of the powder components can be flocced, as by a change in pH, to prevent segregation and retain an intimate mixture. The dispersion can then be filtered as by slip casting, and then dried, either at ambient temperature or elevated temperature, e.g. about 50° C. The dried composite powder is then heated to temperature ranging from about 1700 to about 1850° C., e.g. 1700° C. for approximately 4 hours, to react the three oxide components and obtain a solid solution thereof. The resulting material is then crushed to form an intimate mixture of the three oxide components in the hafnia-rich ternary oxide composition.

The reground solid solution of the ternary oxide composition can then be dispersed in water to form an aqueous dispersion which is again sedimented as by centrifuging to eliminate relatively large particles and agglomerates to obtain particles of 1 micron or less in size.

Silicon nitride in conventional powder form is dispersed in water at a pH required to produce a good dispersion and is treated by sedimentation techniques noted above to remove relatively large particles, i.e. particles greater than one micron size, and provide an aqueous dispersion of silicon nitride particles of micron or submicron size.

The aqueous dispersion of silicon nitride is then mixed with the aqueous dispersion of the hafnia-rich ternary oxide composition, in proportions such that the ternary oxide composition comprises about 10 to about 50%, preferably about 15 to about 30%, by volume, based on the overall composition of silicon nitride and ternary oxide mixture. If desired, a small amount of sintering aid, e.g. about 2 to 4% of alumina by weight of the total solid composition, can be added to the aqueous dispersion or slurry. The resulting aqueous dispersion of the silicon nitride and ternary oxide composition containing, e.g. 15 to 30% by volume of the oxides in the solid composition, can then be formed into a desired shape prior to sintering.

Various forming techniques can be employed to form a shape and consolidate it. Thus, for example, the $Si_3N_4$/ternary oxide composition can be subjected to cold pressing, isostatic pressing, extrusion, injection molding or slip casting. Cold pressing can be carried out in a suitable die under a suitable pressure, e.g. 15,000 psi. In injection molding a plasticizer is generally added with the $Si_3N_4$/oxide composition, and following injection molding to produce the desired shape the plasticizer is removed. Slip casting is generally carried out by introducing the aqueous dispersion of the $Si_3N_4$/ternary oxide composition into a plaster of paris mold where the water is removed leaving a dry layer of powder.

The techniques of press forming, injection molding and slip casting of the $Si_3N_4$/ternary oxide composition are preferred.

The resulting composition shape is then sintered for solidification and densification at sufficiently high temperature, e.g. about 1700° to about 1850° C. Thus, such sintering can be carried out in an air furnace at 1700° C., e.g. for about an hour, or the sintering can be carried out in nitrogen at higher temperatures, e.g. about 1800° C.

The following are examples of practice of the invention, but it will be understood that such examples are only illustrative and not limitative of the invention.

EXAMPLE I

A composition containing 60 m/o (mole percent) hafnia, 20 m/o zirconia and 20 m/o titania is dispersed in water and particles greater than 1 micron are removed by sedimentation. The resulting suspension is mixed in colloidal state assisted by the use of ultrasonic energy. The powder suspension is then flocculated by adjusting the pH by adding hydrochloric acid, to retain an intimate mixture and prevent segregation.

The suspended powder mixture is formed into a disc shape by press filtering through a metal filter disc under pressure, and the resulting shape is dried at 50° C. overnight. The dried composition is then heated at about 1700° C. for four hours in air to form a solid solution. The resulting solid solution is crushed and then ball milled using tungsten carbide, zirconium oxide or aluminum oxide balls.

An aqueous dispersion of the crushed solid solution powder is made and particles of 1 micron size or less are recovered by sedimentation.

Less than 1 micron size $Si_3N_4$ powder and ternary oxide solid solution powder of less than 1 micron size are mixed while suspended in an aqueous slurry, employing 70 v/o (volume percent) $Si_3N_4$ and 30 v/o ternary oxide mixture. 4 w/o (weight percent) $Al_2O_3$ sintering aid is added to the slurry. The resulting slurry is press filtered to form a disc-shaped sample of the powder mixture, and the resulting powder mixture is dried, as noted above, and the dried powder mixture is sintered in air or nitrogen at 1700° C. for one hour. The composite powders are sintered in an aluminum oxide or $Si_3N_4$ crucible.

A tough silicon nitride ceramic composite is obtained of about 98% theoretical density, high strength of about 650 MPa (mega Pascals) and high toughness of 6–8 MPa·m$^{\frac{1}{2}}$.

EXAMPLE II

The procedure of Example I is substantially followed except employing 1 to 5 micron particle size of ternary oxide mixture and less than 1 micron size $Si_3N_4$ powder, and a proportion of 80 v/o $Si_3N_4$ and 20 v/o ternary oxide mixture, and forming the resulting mixture by hot pressing at 1700° C. for 1 hour in a graphite die.

Results similar to Example I are obtained.

EXAMPLE III

The procedure of Example I is followed except that the zirconia, hafnia and titania are coprecipitated in the proper molar ratios, and flocculated to prevent separation.

The solids are then calcined and reacted to form a solid solution.

The $Si_3N_4$ powder and the crushed ternary oxide solid solution powder are mixed in the proportions of 75 v/o $Si_3N_4$ and 25 v/o ternary oxide mixture, to which is added 2 w/o silica to enhance sintering, and the mixture is formed as a colloidal aqueous suspension.

The aqueous suspension is filtered and the resulting powder mixture is mixed with 50 v/o of a plastic binder and the resulting composition is injection molded to form a shaped sample, followed by drying and sintering at 1700° C. for 1 hour in air. The resulting composition is then subjected to hot isostatic pressing at 1600° C. and 30,000 psi to achieve a ceramic composite having near theoretical density.

The novel $Si_3N_4$/ternary oxide ceramic composite materials of the present invention can be employed to manufacture various items of commerce and science. Thus, for example the composites can be employed for the fabrication of advanced heat engine structural components such as Diesel engine components and in other structural applications requiring a tough refractory material having a low coefficient of thermal expansion and high thermal shock resistance, such as for nozzle applications in high performance rocket engines, and in the fabrication of combustion chambers.

From the foregoing, it is seen that according to the invention, tough $Si_3N_4$ ceramic composites having lower thermal expansion than the $Si_3N_4$ matrix material can be produced by incorporating the above hafnia-rich ternary oxide composition as additive, in conjunction with various processing techniques to obtain ceramic composites having a variety of important applications.

It is to be understood that what has been described is merely illustrative of the principles of the invention and that numerous arrangements in accordance with this invention may be devised by one skilled in the art without departing from the spirit and scope thereof.

What is claimed is:

1. A composition for producing a tough $Si_3N_4$ ceramic composite, which comprises a powder mixture of (a) about 50% or more by volume of $Si_3N_4$ and (b) a ternary oxide additive containing 60 or more mole percent hafnia, 10 to 30 mole percent titania and 10 to 30 mole percent zirconia, said oxide additive having a lower coefficient of thermal expansion than $Si_3N_4$, said composition containing about 10% to about 50% by volume of ternary oxide additive based on the overall composition.

2. The composition of claim 1, said composition containing about 15% to about 30% by volume of ternary oxide additive based on the overall composition.

3. A tough $Si_3N_4$ composite ceramic produced by forming and sintering the composition of claim 1.

4. A tough $Si_3N_4$ composite ceramic produced by forming and sintering the composition of claim 2.

5. A method for fabricating a tough $Si_3N_4$ ceramic composite which comprises providing a powder mixture of (a) about 50% or more by volume of $Si_3N_4$ and (b) a ternary oxide additive containing 60 or more mole percent hafnia, 10 to 30 mole percent titania and 10 to 30 mole percent zirconia, said oxide additive having a lower coefficient of thermal expansion than $Si_3N_4$, said composition containing about 10 to about 50% by volume of ternary oxide additive, based on the overall composition, forming said mixture into a predetermined shape, and
sintering said shape to solidify and densify same as high as 98% of theoretical density or near theoretical density.

6. The method of claim 5, including forming said shape by cold pressing, isostatic pressing, extrusion, injecting molding or slip casting.

7. The method of claim 5, said composition containing about 15% to about 30% by volume of ternary oxide additive, based on the overall composition.

8. The method of claim 5, including the steps prior to forming said mixture into a predetermined shape, of
providing an initial aqueous multiphase dispersion containing said hafnia, titania and zirconia components of said ternary oxide additive in the aforesaid proportions.
removing particles greater than 1 micron size in said dispersion,
filtering said dispersion,
drying the filtered powder,
forming said powder into a predetermined shape,
heating said powder to form a solid solution of the three oxide components,
crushing the resulting solid solution powder,
forming an aqueous dispersion of said solid solution powder,
mixing $Si_3N_4$ of micron or submicron particle size in said aqueous dispersion,
filtering said aqueous dispersion, and drying the resulting filtered powder.

* * * * *